United States Patent

[11] 3,619,329

[72] Inventor Donald R. Wright
 Midland, Mich.
[21] Appl. No. 803,348
[22] Filed Feb. 28, 1969
[45] Patented Nov. 9, 1971
[73] Assignee The Dow Chemical Company
 Midland, Mich.

[54] EXTRUSION APPARATUS FOR THE PREPARATION OF WALLED STRUCTURES
 7 Claims, 8 Drawing Figs.
[52] U.S. Cl. .................................................. 156/500,
 18/12 SM, 25/131 SC, 18/5 P, 156/425
[51] Int. Cl. .................................................. B29d 27/00
[50] Field of Search .......................................... 18/5 P, 12
 S; 25/131 SC; 52/80; 156/425, 500; 152/244

[56] References Cited
UNITED STATES PATENTS
2,877,530  3/1959  Winn ........................... 25/131 SC X
3,336,631  8/1967  Smith ........................... 18/5 P
3,336,632  8/1967  Smith ........................... 18/5 P
3,423,791  1/1969  Smith ........................... 18/5 P Primary Examiner—J. Spencer Overholser
Assistant Examiner—Norman E. Lehrer
Attorneys—Griswold and Burdick, Richard G. Waterman and Robert B. Ingraham ABSTRACT: A lightweight plastics extruder is disclosed which can be used with particular benefit in the preparation of structures wherein a foamable plastic is extruded in a desired location and the extruder moved as foam material is deposited.

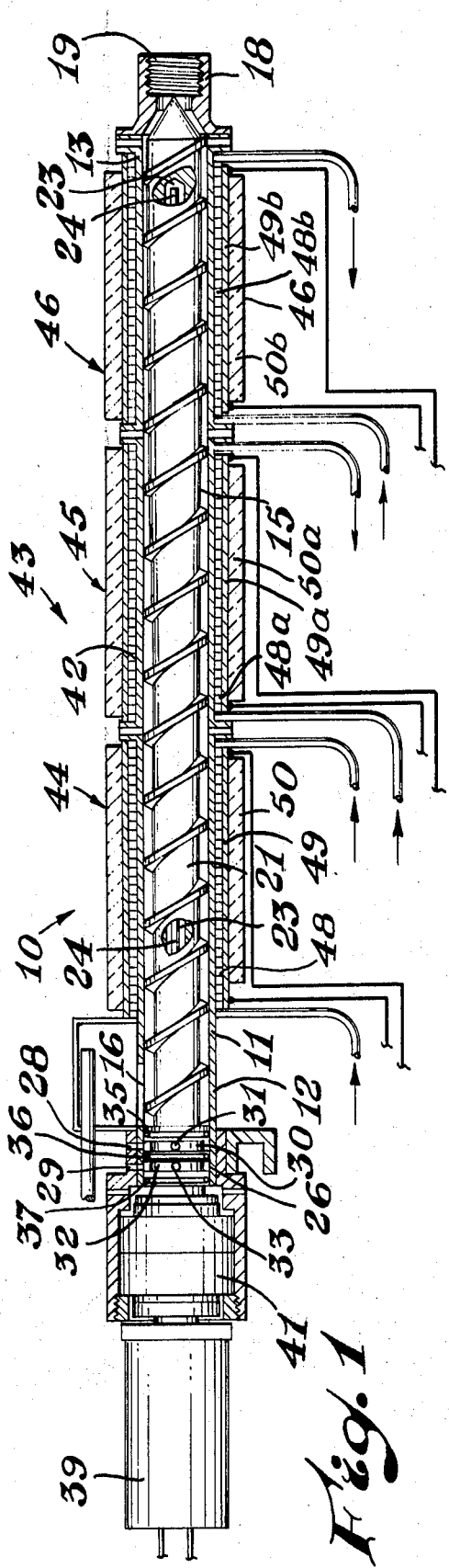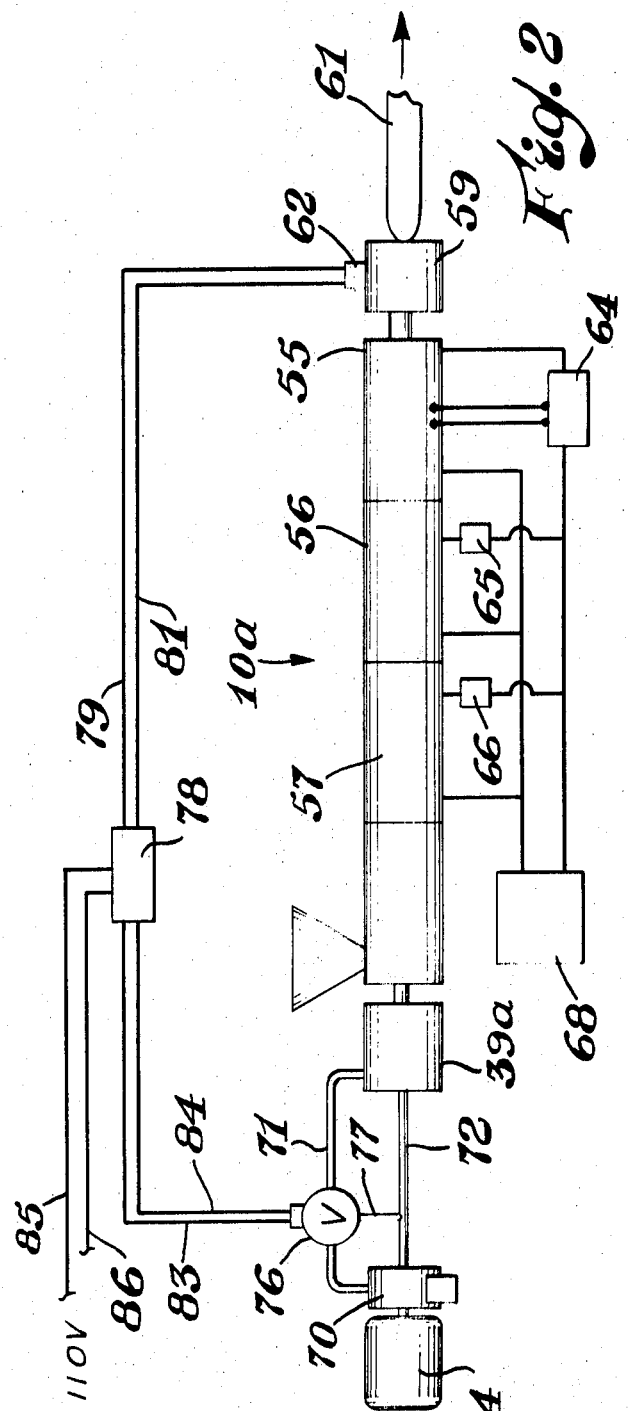
Fig. 1
Fig. 2
INVENTOR.
Donald R. Wright
BY
AGENT

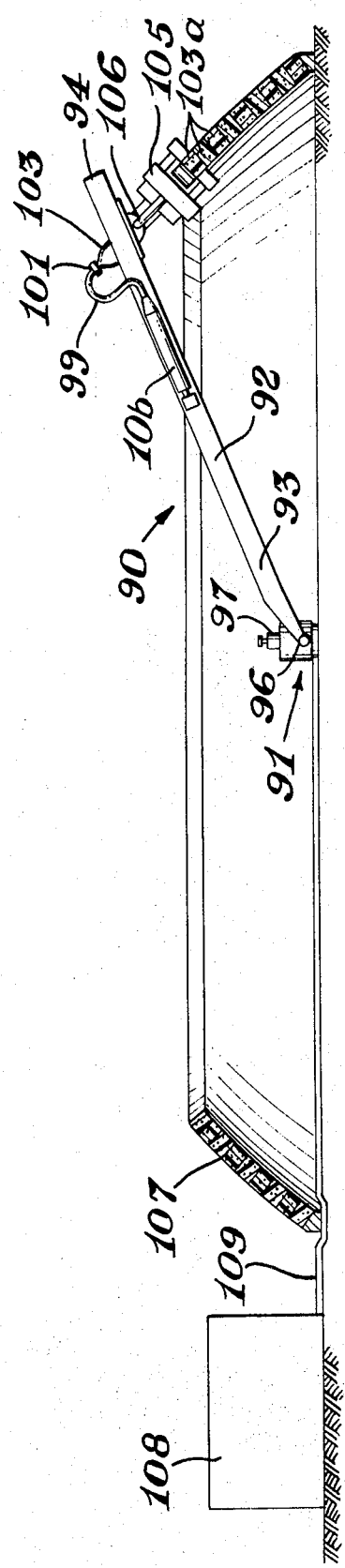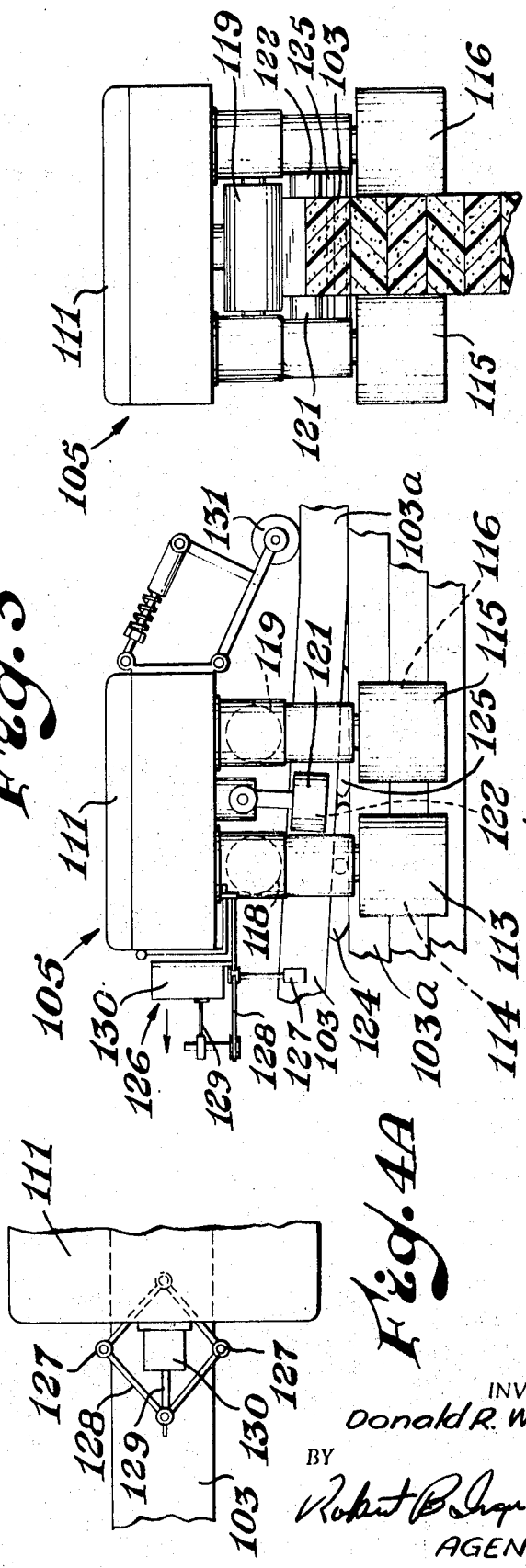

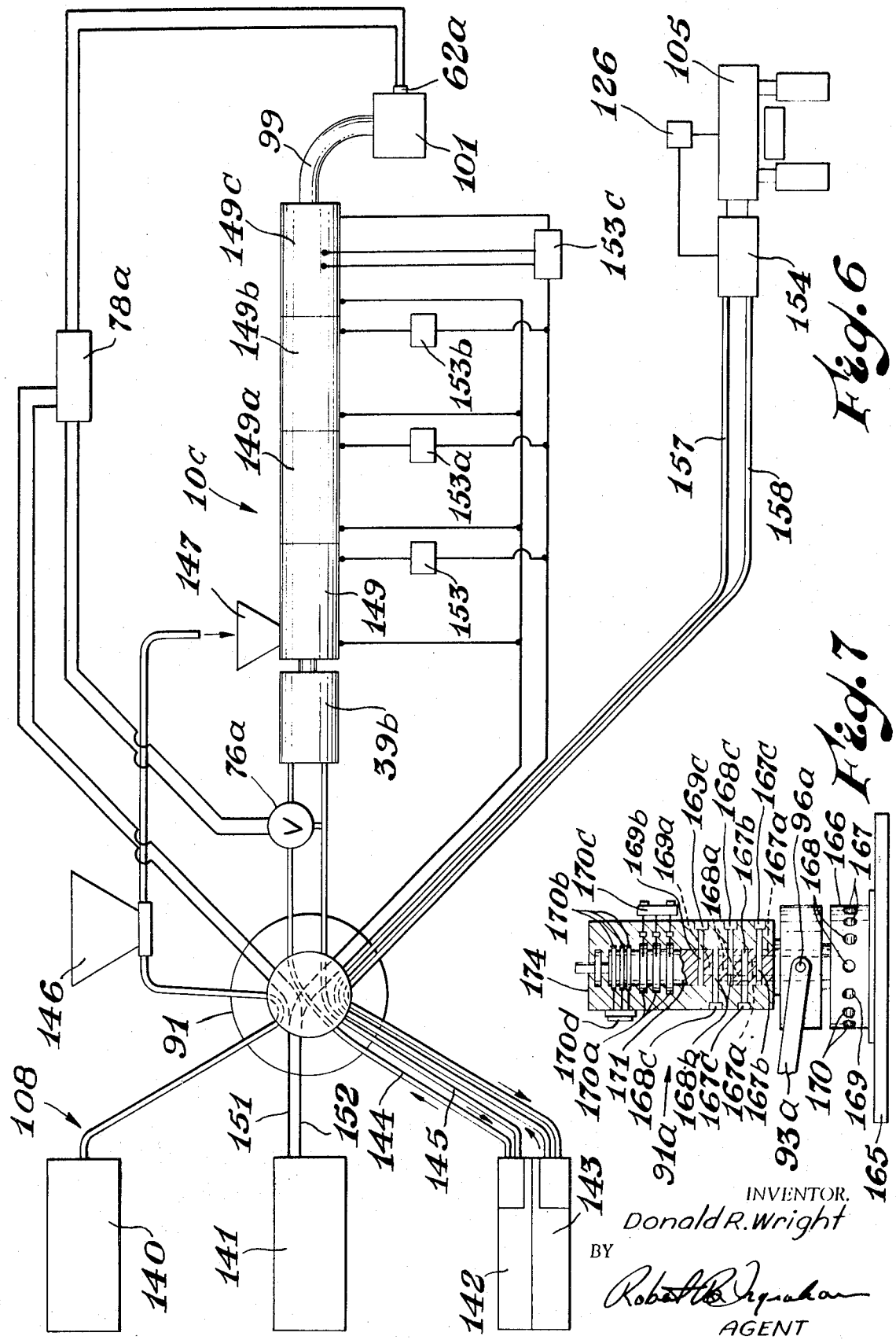

3,619,329

1

EXTRUSION APPARATUS FOR THE PREPARATION OF WALLED STRUCTURES

This invention relates to an improved extrusion apparatus, and more particularly relates to a light weight extrusion apparatus particularly adapted for the extrusion of foamable synthetic resinous compositions.

Extruders, particularly of the screw variety, as presently known to the art are relatively massive pieces of machinery which usually are supported on a fixed base and occasionally are mounted on a mobile base such as a truck or trailer body. Extrusion apparatus for handling thermoplastic resinous materials such as synthetic resins, explosives, rubber and the like often weigh on the order of 2000 pounds for an extruder of two-inch screw diameter. Because of the great weight of such extrusion apparatus, moveable extruders usually are considered impractical except in cases where they may be mounted on a railroad car, large truck or trailer body. In many instances, it would be desirable if there were available a lightweight extrusion apparatus which was readily portable, and beneficially a lightweight extrusion apparatus which could be used for the preparation of structures such as buildings and the like. Such lightweight extrusion apparatus would be of particular advantage in the preparation of synthetic resinous foam products at a site where the foam products were to be used or at a location quite near the site where the foam products were to be used. Foamed synthetic resinous products in general offer a very substantial problem in shipping wherein their great bulk and low weight present a considerable expense and inconvenience in handling. For example, extruded foamed synthetic resinous pipe in general is more economically prepared at a location adjacent its final destination; for example, in providing on-the-site extruded pipe for land drainage and the like. In my earlier U.S. Pat. Nos. 3,206,899 and 3,337,384, there is disclosed a method and apparatus for the manufacture of walled structures from synthetic resinous foam. For the preparation of such structures it is often desirable to employ an extruded foam rather than a foam prepared from expandable particles or beads. The extruded foam is generally of higher strength and more suited for most structural applications than foam prepared by foaming and fusing a plurality of particles. It is also known to prepare structures by admixing foam-forming components and depositing them in a series of layers or turns to provide a structure. Typical apparatus for preparing such materials is shown in U.S. Pat. Nos. 3,336,631 and 3,336,632. Generally, shipping the admixture of foam-forming components permits use of a technique referred to as foam-in-place wherein the foam is generated at the site where it will be used. Such a procedure can be accomplished either by liquid components, such as a polyurethane foamable composition, or by use of expandable plastic particles, often referred to as foam-in-place beads. Both the liquid foam-forming components and the expandable beads or particles have some disadvantages: the expandable beads have finite storage life, often mold to a relatively weak structure, and the liquid components can suffer severely from age and contamination from other materials which impair their foaming characteristics.

It would be a substantial advantage if there were available an apparatus which was readily portable and was capable of extrusion of thermoplastic foamable resins such as foamed polystyrene, and that the extrusion apparatus be of sufficiently lightweight construction that it could be readily handled without the necessity of heavy supports, cranes and the like.

It would also be beneficial if there were available lightweight extrusion apparatus particularly suited for the extrusion of foamable synthetic resinous compositions such as thermoplastics and foamable thermosetting compositions which have a thermoplastic or B-stage.

These benefits and other advantages in accordance with the present invention are achieved in an extruder, the extruder comprising a generally hollow cylindrical barrel, the barrel defining a generally cylindrical cavity therein, an extrusion screw disposed within the barrel and adapted to rotate therein, the barrel having a feed end and a discharge end, means to supply a synthetic resinous extrudable composition to the feed end of the barrel, the screw having a feed end and a discharge end, a variable speed drive means associated with the screw and adapted to rotate the screw in a desired direction to forward synthetic resinous material from the feed end to the discharge end, temperature control means disposed on the barrel between the feed end and the discharge end, the extrusion apparatus being operatively connected to a variable power source for the variable speed drive means and a temperature control means.

Further features and advantages of the present invention will become more apparent from the following specification taken in connection with the drawing wherein:

FIG. 1 schematically depicts a sectional view of a lightweight extruder in accordance with the invention.

FIG. 2 is a schematic representation of an extruder in accordance with the invention in association with a power supply and temperature control means.

FIG. 3 schematically represents an extrusion apparatus in accordance with the invention adapted to form a structure by the deposition of successive layers of foamable resinous material.

FIGS. 4 and 5 are views of a forming head which beneficially is employed in cooperation with the extruder of FIG. 3.

FIG. 4A depicts a top view of a portion of the forming head of FIG. 4.

FIG. 6 schematically depicts the controls and power supply employed in the apparatus of FIG. 3.

FIG. 7 schematically shows a sectional view of a pivot which may be employed in the apparatus of FIG. 3.

In FIG. 1 there is schematically depicted a sectional view of an extruder in accordance with the present invention generally designated by the reference numeral 10. The extruder 10 comprises a generally cylindrical barrel 11, the barrel 11 having a feed end 12 and a discharge end 13. The barrel 11 defines a generally cylindrical internal cavity 15 extending the entire length thereof. Adjacent the feed end 12, the barrel 11 defines a feed port 16. Affixed to the discharge end 13 is a nose piece 18 having defined therein connecting means 19 adapted to receive a conduit, or a die to discharge material. An extrusion screw 21 is rotatably disposed within the cavity 15 of the barrel 11. The screw 21 has an increasing root diameter; that is, decreasing working volume as one progresses from the feed end 12 to the discharge end 13 along the barrel 11. The screw 21 has an internal cavity 23 extending the length thereof within which is disposed a conduit 24. The conduit 24 and the cavity 23 extend almost the entire length of the screw and both terminate in a region remote from the feed end 12 of the barrel 11. The conduit 24 communicates with the cavity 23. Adjacent the feed end 12 of the barrel 11 is disposed a rotary joint 26. The rotary joint 26 defines a first passageway 28 which is in operative communication with the cavity 23 and the screw 21 and a second passageway 29 which is in communication with the conduit 24. An annular groove 30 disposed about the periphery of the screw 21 provides communication with the passageway 28 and a passageway 31 provides communication between the annular groove 30 and the cavity 23. A second annular groove 32 is disposed about the screw 21 and provides communication with a passageway 33 which in turn communicates with the conduit 24 thereby permitting circulation of heat exchange fluid within the screw 21. Disposed adjacent the annular grooves 30 and 32 are seals 35, 36 and 37 which beneficially are formed by positioning an O-ring within suitable retaining means defined by the screw. A motor 39 is operably connected to the the screw 21 by means of a coupling 41. The motor 39 is advantageously a hydraulic motor or a high-speed electric gear head motor with a high ratio gear reducer. Between the feed port 16 and the discharge end 13 of the barrel 11 is an outer surface 42 of bare metal. Over the surface 42 is disposed a temperature control means 43. The temperature control means 43 comprises three zones, a first zone 44 adjacent the feed port 16, a second zone 45 adjacent the zone 44 and remote from the feed port, and a third zone 46 adjacent the discharge end 13 of the barrel 11. The first zone 44 comprises a helically disposed winding 48 of an electrically conductive tubing, beneficially square copper tubing, which is in operative communication with a source of heat exchange fluid (not shown). Beneficially, adjacent turns of the winding 48 are in electrical contact with each other. The heating zone 44 has disposed thereon a winding 49 of insulated electrical wire which is in operative communication with a source of electrical power, not shown. A thermally insulating layer 50 is disposed over the winding 49. The winding 49 serves as a primary winding of a transformer and the winding 48 as a single turn shorted secondary for induction heating of the barrel 11. The heating zones 45 and 46 are of similar construction having windings 48a and 48b, respectively, of hollow electrically conductive tubing in communication with heat exchange fluid supply means (not shown) and windings 49a and 49b which in turn are enclosed in insulating layers 50a and 50b, respectively. Advantageously, all possible components of the extruder 10 are fabricated from light metal such as aluminum, magnesium, titanium, and the operating conditions of the extruder maintained in such a fashion that material being extruded therethrough is maintained under pressures of not more than 500 pounds per square inch, and preferably about 200 pounds per square inch. Beneficially a barrel liner of nickel, titanium or other corrosion resistant material may be employed if required, as well as a plated screw. Rapid start-up is readily obtained by passing hot heat exchange fluid through the windings 48, 48a and 48b, as well as within the cavity 23, into the conduit 24 of the screw 21, applying electrical power to the windings 49, 49a, 49b to inductively heat the barrel 11. When desired temperature is reached or approached, the supply of heat exchange fluid and power is adjusted accordingly to obtain the desired operating conditions which, of course, are dependent on the material being utilized.

In FIG. 2 there is schematically depicted an extruder in accordance with the present invention generally designated by the reference numeral 10a. The extruder 10a has a discharge heat control zone 55, an intermediate temperature control zone 56 and a feed temperature control zone 57. The extruder 10a discharges into a die 59. The die 59 discharges a foam thermoplastic body 61. A pressure sensing transducer 62 is in operative combination with the die 59 and senses pressure within the die. Temperature control means 64, 65 and 66 are in operative combination with the temperature control zones 55, 56 and 57 which are in communication with a source of electrical power 68. The screw of the extruder 10a is in operative combination with a hydraulic motor 39a. The hydraulic motor 39a is in operative combination with a source of pressurized hydraulic fluid 70 such as a hydraulic pump by means of lines 71 and 72, the pump in turn being driven by a motor 74. A proportional control valve 76 is disposed within the line 71 and is in operative connection with a bypass conduit 77 which is also in operative combination with the line 72. The transducer 62 of the die 59 is in operative combination with a proportional controller 78 by means of lines 79 and 81. The controller 78 in turn operates the proportional control valve 76 through lines 83 and 84. The controller 78 in turn is in communication with a power source (not shown) by means of lines 85 and 86. As the die pressure increases, hydraulic fluid is bypassed through the bypass conduit 77 and the die pressure is maintained generally constant. Operating the extruder 10a at a generally constant die pressure permits a maximum volume of material to be passed therethrough at a minimal pressure and permits use of light metal alloys and eliminates high surging pressures within the extruder.

In FIG. 3 there is schematically depicted an extrusion apparatus generally designated by the reference numeral 90. The extrusion apparatus 90 comprises in operative combination a pivot or base 91, an arm 92 having a first end 93 and a second end 94, the first end 93 being pivotally affixed to a rotatable support 96. The support 96 in turn is secured to a generally vertically extending stub shaft 97 affixed to the pivot 91. Thus, the second end 94 of the arm 92 is adapted to pivot in two planes and position the second end on a desired surface to be generated. As illustrated, the arm 92 can be pivoted within a solid angle. An extruder 10b generally similar to the extruders 10 of FIG. 1 and 10a of FIG. 2 is supported on the arm 92 adjacent the second end 94. The extruder 10b discharges into a flexible conduit 99. The conduit 99 remote from the extruder 10b terminates in a die 101. The die 101 discharges a heat plastified synthetic resinous foam strip 103 which is passed to a forming head 105 pivotally affixed to the second end 94 of the arm 92 by means of a pivot 106. The foam strip 103 is passed through the forming head 105 where it is shaped while still in heat softened form into a strip 103a and adhered to an adjacent strip 103a. The apparatus 90 of FIG. 3 continuously extrudes the foam strip 103 as the arm 92 pivots about the support 91 depositing a plurality of generally helically disposed turns 103a to thereby form a structure 107 generally similar to that shown in U.S. Letters Pat. Nos. 3,206,899 and 3,337,384. A power source 108 is in operative communication with the extruder 10b, forming die 101 and forming head 105 by means of a plurality of conduits 109 which pass through a swivel joint (not shown) in the base 91.

FIG. 4 depicts a side view of the forming head 105 of FIG. 3. The forming head 105 comprises a body 111 upon which are pivotally supported structure engaging rolls 113 and 115. A similar pair of structure engaging rolls 114 and 116 are oppositely disposed. The structure engaging rolls 113, 114, 115, and 116 are driven by means of a power source (not shown) within the body 111 such as a hydraulic motor. The drive arrangement of the forming head 105 is generally similar in construction to that shown in my earlier U.S. Pat. No. 3,337,384. Also pivotally supported by the body 111 are transverse foam engaging rolls 118 and 119 adapted to engage a freshly extruded strip of foam 103. A pair of side foam engaging rolls 121 and 122 are rotatably supported by the housing 111. The foam shaping rolls 118, 119, 121 and 122 are friction driven by the strip 103. The rolls 118, 119, 121 and 122 define a generally rectangular channel therebetween and force the heat softened strip 103 into a generally rectangular cross-sectional configuration. Also pivotally supported by the body 111 are first and second sealing plates 124 and 125 which extend transversely and generally parallel to the rolls 118 and 119. The plates 124 and 125 act also as support members for the forming head 105 when in engagement with a structure being generated. It is advantageous to employ two plates in that the head will prepare smaller diameter structures than if only a single sealing plate is employed. The sealing plates are internally heated and adapted to raise the temperature of the adjacent surface of the strip 103 to a heat sealing temperature and the surface of an adjacent strip 103a also to a heat sealing temperature. A resiliently loaded follower roll or pressure means 131 is supported by the body 111 and adapted to force the heated surface of the strip 103 into engagement with the heated surface of the strip 103a. On cooling, the strip 103 is heat sealed to the strip 103a. A strip sensing means and control element 126 is affixed to the body 111 remote from the follower roll assembly or pressure means 131. The control element 126 has strip engaging members 127 disposed on opposite edges of the strip and forming free opposed corners of a rectangular four-bar linkage 128. The corners of the four-bar linkage supporting the members 127 are resiliently tensioned toward each other by means not shown. One of the remaining pivot points of the four-bar linkage is pivotally affixed to the support or base 111 while the opposite pivot is in operative engagement with a linear actuator 129 of a control means 130. Thus, as the four-bar linkage 128 is free to flex at any of its corners and move laterally, the signal transmitted to the controller 130 is proportional to the width of the strip only and not to the precise lateral location of the strip.

FIG. 4A depicts a top view of the strip sensing means and control element 126 in engagement with the strip 103. As the strip becomes wider, the head 105 is driven about the periphery of the structure at a more rapid rate to maintain the desired width of the strip by stretching of the incompletely cooled foam. If the strip becomes narrow, the head 105 is driven more slowly and the width of the foam strip increases.

In FIG. 5 there is depicted a view of the forming head 105 with the follower roll 131 removed to more clearly show the relative positions of the structure engaging rolls 115 and 116, the shaping rolls 118, 119, 121 and 122.

FIG. 6 schematically depicts the control arrangement for an apparatus such as the apparatus 90 of FIG. 3 omitting the heat exchange fluid connections and controls. An extruder 10c and the forming head 105 are operatively connected through the pivot or base 91 which provides a rotary joint which carries the supply requirements of the extruder to the forming head 105. The power source 108 comprises a source of compressed air 140, a source of alternating electrical current 141, a first hydraulic fluid supply or pump 142 and a second hydraulic fluid supply or pump 143. The first hydraulic pump is operatively connected to a hydraulic motor 39b by means of lines 144 and 145. A bypass valve 76a is disposed within the line 144 in a manner similar to the valve 76 of FIG. 2. The valve 76a is controlled by a transducer 62a which senses internal pressure of the die. The transducer operates a proportional controller 78a which in turn is in operative communication with the power source 108. The controller 78a and bypass valve 76a are operated to maintain a generally constant die pressure within the die 101. A source of synthetic resin 146 is in operative combination with the air source 140. Air from the source 140 entrains granular material from the source 146 and delivers it to a feed hopper 147 in operative communication with the extruder 10c. The alternating current source 141 is in operative communication with the proportional controller 78a and temperature control zones 149, 149a, 149b and 149c through supply lines 151 and 152 and power or temperature control units 153, 153a, 153b and 153c, respectively. For the sake of clarity, lines depicting heat exchange fluid supply to the extruder 10c have been omitted. The second source of hydraulic fluid 143 is in operative communication with a hydraulic motor 154 in operative communication with the forming head 105 through lines 157 and 158. The strip sensing and speed control arrangement 126 for the motor 154 is depicted in FIGS. 4 and 4A.

In FIG. 7 there is schematically depicted a sectional view of a pivot or base 91a such as is employed in the apparatus of FIG. 3. The base 91a comprises a fixed support 165 having rigidly secured thereto a connector and conduit block 166 having a first pair of passages 167 in communication with passages (not shown) within the block 166 and forming the inlet and outlet of a first hydraulic fluid circuit. A pair of passages 168 are also in communication with passages (not shown) within the block 166 to form the inlet and outlet of a second hydraulic circuit. The block 166 defines an opening 169 adapted to receive a fluid cooling media such as air and also in communication with a passage within the block 166 (not shown). A pair of openings 170 are also disposed within the block 166 and are in communication with electrical conduit passages (not shown). Rigidly affixed to the block 166 is a stub shaft or mandrel 171 having defined therein first and second passages 167a which are in operative communication with the openings 167 of the block 166 and terminate in annular recesses 167b circumferentially disposed about the shaft or mandrel 171. The openings 168 are in communication with passages 168a which in turn terminate in annular recesses 168b similarly disposed to the recesses 167b. The opening 169 is in communication with a passage 169a which terminates in an annular passage 169b. The openings 170 are in operative communication by means of insulated electrical conductors (not shown) with a plurality of first slip rings 170a in power circuits for heaters and the like and a plurality of slip rings 170b which are employed for control circuit purposes. A rotary sleeve 174 is disposed over the mandrel 171 and is adapted to pivotally rotate thereabout. The sleeve 174 has a pivot 96a which pivotally supports a boom or elongate member 93a. The sleeve 174 defines passages and connection means 167c which are in operative communication with the annular grooves 167b as the sleeve 174 is rotated about the mandrel 171. Similarly, the openings 168 are in communication with the passages and connection means 168c and the opening 169 is in operative communication with a connecting means and passages 169c. Suitable sealing means (not shown) such as O-rings are disposed adjacent the annular passages 167b, 168b and 169b to provide a fluid tight seal on either side of each of the annular recesses. Suitable electrical connections 170 are provided to the slip rings 170a and 170b. The sleeve 174 supports a first brush and connector assembly 170c in operative communication with the slip rings 170a and a brush and connector assembly 170d in communication with the slip rings 170b. Suitable electrical and hydraulic fluid cooling connections are made from the openings 167c, 168c and 169c and the connector brush assemblies 170c and 170Xd to operating elements such as the extruder forming head and the like supported by the elongate member 93a, the connecting lines being of sufficient length to permit rotation of the boom about the axis of the pivot 96a disposed at right angles to the axis of the mandrel 171 permitting the boom with its associated fluid conduits and electrical cables to traverse at least a major portion of the solid angle without the necessity of rotation of supply lines in communication with the various openings in the block 166.

In operation of apparatus in accordance with the present invention for the preparation of a building structure, apparatus generally in accordance with FIG. 3 is employed. A tapering starter strip is extruded from the die 101 generally as disclosed in my previous U.S. Pat. Nos. 3,206,899 and 3,337,384 and successive turns of a helix deposited in a predetermined pattern until the desired height of structure is obtained. Beneficially, employing a remote power source, hydraulic or electric motors are advantageously utilized to drive the screw of the extruder and to operate the forming head 105. By employing the control arrangements such as are set forth in FIGS. 2 and 6, the rate of extrusion of the extruder as well as extrusion conditions can be closely maintained. By employing a pressure transducer such as the transducer 62 to activate a proportional controller such as the controller 78, the screw speed is varied in such a manner that a generally constant die pressure is obtained and the pressure rating of the extruder barrel is not exceeded, assuming, of course, that adequate heat input is maintained to the heating zones of the extruder. Beneficially, the temperature of the various zones in the extruder and the screw temperature are remotely controlled from the power source. When electrical heating is utilized, suitable silicon controlled rectifier circuitry well known in the art is employed with particular benefit.

In a similar manner, the sealing plates or shoes 124 and 125 are advantageously electrically heated and the temperature thereof controlled by varying the power supplied thereto such as by the use of silicon controlled rectifiers or other conventional power control means. A forming head such as the head 105 is driven by an electric or hydraulic motor. The speed of the head is controlled by the sensing and control element 126. By virtue of motion imparted by the four-bar linkage 128, the linear actuator 129 conveniently may operate a potentiometer, variable resistor, hydraulic valve, pneumatic pilot valve or other conventional signal generating element for control of the forward speed of the head 105. Thus, minor variations which occur in the extruder and are not controlled by either temperature or flow rate are corrected by the depositing head 105.

Beneficially, a wide variety of foamable materials are extrudable from such an apparatus including thermoplastics and extrudable thermosets which cure at a rate to permit the extrusion and heat sealing of adjacent strips to each other. A foamable material may be fed to the feed hopper of the extruder; e.g., foamable polystyrene granules; that is, polystyrene having a suitable liquid or solid blowing agent within or on the particles. Alternately, a nonfoamable material may be fed to the extruder and the blowing agent incorporated therein by pumping directly into the barrel at a location where the material is in heat plastified form and the blowing agent admixed therewith by action of the extrusion screw. Most often, it is desired to feed the extrudable material from a location remote from the extruder. This is readily accomplished by pneumatic conveying through the base pivot to the extruder hopper at the extruder, or alternately, the hopper may be filled periodically from an external source as the apparatus rotates. Such materials are well known in the art and need not be further discussed. Usually it is desirable to employ foam for construction; however, nonfoamable extrudable materials may also be employed if desired.

The extrusion die such as the die 101 of FIGS. 3 and 6 or the die 59 of FIG. 2 may be of the conventional foam forming variety wherein the foamable heat plastified material is discharged from a relatively small configuration and permitted to expand in a nozzle, bazooka or other restraining and shaping means which serves to form the foam to a desired configuration; for example, in the practice of the present invention, the form is formed to a section having a cross-sectional configuration approximating a rectangle. Alternately and advantageously, the foamable heat plastified material may be extruded from a die having the configuration of a pair of crossed slots or an X-configuration. The foamed extrude issuing from such a slot approximates a square which is further shaped into the desired configuration by rolls such as the rolls 118, 119, 121 and 122. Alternately, a round, rectangular or other desired shape tube is employed with benefit.

Generally for most structural purposes, it is desirable to employ a foaming mixture which does not utilize a plasticizing-type blowing agent; that is, a blowing agent having a high solubility in the polymer, but a blowing agent which has limited or low permeability through the polymer forming the cell walls of the resultant foam to assure minimum deformation of the foam on aging. Usually, it is desired to prepare a rigid structure having dimensional stability. However, minor shrinkage and warping can be tolerated, particularly if metallic reinforcing is incorporated in the joint between adjacent strips in the manner set forth in my earlier U.S. Pat. Nos. 3,206,899 and 3,337,384.

By way of further illustration, an extrusion apparatus generally in accordance with the arrangement shown in FIG. 1 is constructed employing a magnesium alloy extrusion screw having a diameter of about 2 inches employing steel tube as a barrel and ¼-inch square copper tubing with 0.040 inch wall thickness as the induction heating and heat transfer elements corresponding to the elements 48, 48a and 48b of FIG. 1. An electrical resistance winding is disposed over and insulated from the winding of copper tubing. Each winding is about 1150 turns of 017 copper wire and with an applied voltage of 220 volts AC draws a current of about 7.3 amperes. The control system is generally as shown in FIGS. 2 and 6 and a hydraulic motor coupled to the screw. Polystyrene containing about 6 percent dichlorodifluoromethane is extruded at a rate of about 200 pounds per hour to provide a satisfactory foam. The extruder, including hydraulic motor, feed hopper, pressure transducer, weighs about 125 pounds. The extruder is subsequently fixed to a boom and forming head such as is shown in FIGS. 3, 4 and 4A and a generally hemispherical structure of foamed polystyrene about 3 inches thick, 40 feet in diameter and 20 feet high is deposited in a period of about 16 hours. A four-foot diameter hole in the top center is subsequently filled by hand with a foam cap. Granular polystyrene particles containing about 5 weight percent dichlorodifluoromethane are conveyed by means of an air conveyor to the feed hopper.

In a manner similar to the foregoing illustration, foamable plastic compositions are readily extruded employing a lightweight extruder and such an extruder is particularly suitable for the preparation of walled structures.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

I claim:

1. An apparatus for the preparation of structures from an extrudable, hardenable material which comprises in cooperative combination
   a base,
   a pivot member affixed to the base, the pivot member supporting
   an elongate arm having a first end and
   a second end, the first end of the arm being pivotally affixed to the pivot, the pivot permitting motion of the second end of the arm on a desired surface,
   an extruder affixed adjacent the second end of the arm, the extruder comprising
   means to receive and heat plastify a synthetic resinous material and
   die means to discharge said heat plastified synthetic resinous material from the extruder as an elongate formed, heat plastified strip,
   means to rotate said arm about said base and successively deposit a plurality of strips, and
   means to adhere adjacent strips together.

2. An apparatus for the preparation of structures from extrudable heat plastifiable plastic materials comprising
   a support means, the support means in cooperative combination with means to position said support means along a predetermined path,
   an extruder supported by said support means, the extruder having means to extrude a heat plastified synthetic resinous material and die means to discharge the synthetic resinous material in a formed elongated heat plastified striplike configuration,
   means to shape said strip supported adjacent said extruder, and
   means to join said strip to a previously deposited strip.

3. An apparatus for the preparation of walled structures from a heat plastifiable material comprising
   a base, the base comprising
   a pivot,
   a support arm affixed to the pivot, the support arm having
   a first end affixed to the pivot and
   a second end disposed remotely from the pivot, the second end of said arm adapted to describe at least a portion of a solid angle,
   a screw extrusion apparatus affixed to the second end of said arm, the screw extrusion apparatus comprising
   a barrel,
   a screw disposed within said barrel,
   means to rotate said screw,
   a heating means disposed on said barrel and adapted to raise the temperature of a thermoplastic material contained within the barrel to an extrusion temperature,
   a forming and sealing head supported by the second end of said arm adapted to receive a heat plastified extruded strip from said extruder and to shape said strip to a desired configuration and heat seal said strip to a previously deposited strip.

4. The apparatus of claim 3 wherein said forming and sealing head includes means to detect the width of said strip, the means to detect the width of the strip being in operative combination with a drive means, the drive means adapted to forward said forming and sealing head and said second end in a desired direction and maintain the extruded strip at a generally constant width.

5. The apparatus of claim 4 wherein the screw extruder is driven by a hydraulic motor.

6. The apparatus of claim 5 including means to control the speed of the hydraulic motor to maintain a generally constant pressure within the discharge portion of the extruder.

7. The apparatus of claim 3 wherein the screw extruder is a cylindrical barrel, the barrel having a heating zone, the heating zone having disposed on the surface thereof a close-spaced winding of hollow metallic tubing and a conductive insulated winding disposed thereover adapted to inductively heat the tubular winding.

* * * * *